United States Patent [19]

Annunziata et al.

[11] Patent Number: 4,701,630
[45] Date of Patent: Oct. 20, 1987

[54] LOCAL AREA NETWORK STATION CONNECTOR

[75] Inventors: Eugene J. Annunziata, Durham; James M. Faress, II; Thomas E. Stammely, both of Cary, all of N.C.

[73] Assignee: International Business Machines Corp., Armonk, N.Y.

[21] Appl. No.: 749,369

[22] Filed: Jun. 27, 1985

[51] Int. Cl.$^4$ .............................. G06F 3/00; H04J 3/02
[52] U.S. Cl. .................................... 307/112; 307/115; 370/88; 370/85; 364/186; 340/825.5
[58] Field of Search ....................... 307/34, 35, 36, 37, 307/38, 39, 64, 66, 112, 115; 364/130, 131, 132, 138, 149, 400, 401, 200, 900; 371/2, 10, 11; 375/36; 340/825.5, 345; 324/51; 370/85-89

[56] References Cited

U.S. PATENT DOCUMENTS

| | | | |
|---|---|---|---|
| 3,688,262 | 8/1972 | Liquori et al. | 307/115 X |
| 3,732,543 | 5/1973 | Rocher et al. | 370/88 |
| 3,796,835 | 3/1974 | Closs et al. | 370/89 X |
| 3,806,814 | 4/1974 | Forbes | 370/85 X |
| 3,818,447 | 6/1974 | Craft | 370/85 X |
| 4,039,757 | 8/1977 | Frisone | 370/88 |
| 4,166,198 | 8/1979 | Mattern | 370/85 X |
| 4,227,178 | 10/1980 | Gergaud et al. | 364/900 X |
| 4,393,497 | 7/1983 | Cantwell | 370/86 X |
| 4,417,242 | 11/1983 | Bapst et al. | 370/86 X |
| 4,428,046 | 1/1984 | Chari et al. | 364/200 |
| 4,500,951 | 2/1985 | Sugimoto et al. | 364/186 |
| 4,567,482 | 1/1986 | Dolsen et al. | 370/15 X |
| 4,583,088 | 4/1986 | Bux et al. | 370/85 X |

Primary Examiner—William M. Shoop, Jr.
Assistant Examiner—Shik Luen Paul Ip
Attorney, Agent, or Firm—Joscelyn G. Cockburn

[57] ABSTRACT

A wiring methodology for attaching office machines to a communications network includes at least one central wiring facility or concentrator with lobe segments emanating or fanning out in a "Star Fashion" configuration to terminal points within offices. A plurality of switch control elements are provided in the concentrator. When activated, each switch control element inserts a lobe segment and attached machines into the communications network. Lobe segments not in use are bypassed (disconnected) within the concentrator. A single station connector (SSC) can be used to increase the number of office machines that may be attached to a single lobe segment. In addition, the SSC may be used to configure a mobile Local Area Network (LAN) System without resorting to permanent wiring schemes.

20 Claims, 9 Drawing Figures

| FIG. 6A |
| FIG. 6B |

LOCAL AREA NETWORK STATION CONNECTOR

CROSS REFERENCE TO RELATED PATENTS, PATENT APPLICATION AND ARTICLES

U.S. Pat. No. 4,527,216, entitled "Sub-Milliamp Mechanical Relay Control," filed Mar. 16, 1983; issued July 2, 1985 to Thomas E. Stammely and assigned to the assignee of the present invention, describes a circuit arrangement suitable for controlling a bi-stable relay. The circuit arrangement includes a capacitor which is initially charged with a charge that is sufficient to set and reset the bi-stable relay. During the set cycle a portion of the charge is dumped into the set coil to set the relay. During the reset cycle the remaining portion of the charge is dumped into the reset coil thereby resetting the relay.

U.S. patent application Ser. No. 507,252, entitled "Terminal Disconnect and Media Wire Fault Detect Mechanism," filed June 23, 1983, by E. J. Annuziata et al and assigned to the assignee of the present invention, describes a methodology and apparatus for testing in site the wiring between a data terminal equipment and a ring or similar type local area network having a loop conduction path with a plurality of data terminal equipment coupled to said loop conduction path.

An article entitled "Local Area Network Station Connector" by E. J. Aunnunziata et al and published in the IBM Technical Disclosure Bulletin, Vol. 27, No. 2, July 1984, page 952, describes a wiring topology that allows multiple stations to be connected to a single local area network lobe.

BACKGROUND OF THE INVENTION

1. Field of the Invention

The present invention relates to multi-station communication systems in general and more particularly to arrangements for coupling data terminal equipment (DTE) to said communication systems.

2. Prior Art

The use of a communications network for interconnecting DTE (such as computers, printers, work stations, telephones, etc.) is well known in the prior art. One type of well-known prior art communications networks is the ring. A ring communications network usually includes a backbone or main ring formed from a physical media configured onto a ring or closed loop. The physical media may be conductive wire, fiber optics, etc. A plurality of interconnecting segments are tapped into the main ring. The DTEs are connected to the interconnecting segments.

The prior art has provided several devices and arrangements for interconnecting DTEs to communications networks. The device range from a simple electrical connector to more elaborate arrangements. U.S. Pat. No. 4,449,778 and 4,501,459 describe electrical connectors suitable for attaching a DTE to a wall outlet. The connectors are hermophroditic in that the two mating sections, for each connector, have similar attributes or characteristics. Essentially, the mating interface on each section includes four spaced conducting members designed to coact with similar situated members when the two halves are connected. Each connector half includes a shorting bar which is placed in close proximity to the conducting members. When the connector is separated, selected the conducting members contact the shorting bar thereby placing the connector in a wraparound mode. In this mode, signals on output conductors are wrapped around onto input conductors. When the connector halves are in mating engagement, the conducting members are in contact and electrical signals pass through the connector.

An article entitled "Modular Wiring System" by R. A. Thorpe and published in the IBM Technical Disclosure Bulletin, Vol. 18, No. 1, March 1976, page 3286, describes a wiring installation in which a plurality of pluggable terminals are interconnected by conductive wires to a logical loop structure. Both primary and secondary stations can be coupled to the pluggable terminals.

Still other types of interconnecting arrangements for interconnecting DTEs to communications networks are described in U.S. Pat. Nos. 4,035,770; 4,245,343; 4,428,046; 4,476,543; 4,494,185 and 4,511,759.

Although the above-described interconnecting arrangements works well for their intended purposes, the main drawback is that the interconnecting arrangements are generally implemented as permanent wiring in a building. This means that the machines in an office cannot be easily adjusted (either in number or location) once the wiring is installed. It is common knowledge that today's office environment requires a wiring arrangement that gives a user maximum flexibility in arranging and/or rearranging machines in an office.

SUMMARY OF THE INVENTION

It is a main object of the present invention to provide a wiring arrangement which is more efficient than has heretofore been possible.

It is another object of the present invention to provide a wiring arrangement which can be used to configure a Local Area Network (LAN) communications system without resorting to a permanent wiring configuration.

The improved wiring arrangement of the present invention includes a wiring concentrator having an input terminal for accepting signals from a communications highway (such as a ring) and an output terminal for outputting signals on the communications highway. A plurality of switching modules are provided in the wiring concentrator. When activated, each switching module inserts its attached lobe segment into the ring. Each lobe segment terminates in a connector which is usually fixed in the wall of an office. A station including an office machine is connected to the connector. A backup internal signal is also provided in the wiring concentrator. Several wiring concentrators may be connected in tandem.

A single station connector (SSC) can be used to extend the lobe segment so that a plurality of stations can be connected to a single lobe segment. In the extended mode a plurality of SSCs are connected in tandem to the connector. A single station is then coupled to a single SSC.

In one embodiment a plurality of SSCs are connected in tandem with a single station connected to each SSC. This configuration forms a non-permanent local area communications network.

Each of the above-described switching modules includes a terminal connector operable for terminating a pair of transmit conductors and a pair of receive conductors. A signal isolation means is placed in each pair of conductors. A switching means, operable when activated for inserting/de-inserting the module, is coupled to the isolation means and an activation logic circuitry is coupled to the switching means.

The single station connector includes the elements of the above-described switching modules plus means that controls a phantom drive current. The phantom current is supplied by a station and activates the switching module in the wiring concentrator and/or the switching module in the SSC so that the station can be inserted/de-inserted. The means may be operated in two modes. In one mode of operation the means allows the phantom current from a native node (to be described hereinafter) to "pass through" and activate appropriate switching modules, thereby inserting a node (or station) into the ring. Simultaneously, the phantom current from non-native nodes is blocked and returned to the originating node. In another mode of operation the means is rendered non-functional. In either mode the switching module element of the SSC inserts/de-inserts a station.

The foregoing features and advantages of this invention will be more fully described in a description of the accompanying drawings.

DETAILED DESCRIPTION OF THE PREFERRED EMBODIMENT

The present invention (to be described hereinafter) may be used for attaching any data terminal equipment (DTE) to a communications network or highway. It works well in connecting DTEs to a local area network such as a ring communications system and as such will be described in this environment. However, this should not be construed as a limitation on the scope of the invention since it is intended that the circuit arrangement disclosed herein can be used for attaching DTEs to a non-ring communications network. Also, in the description it is assumed that the communications medium is conductive wire. Again, this medium is chosen only as a means of describing the present invention since it is well within the skill of the art to use other types of communications media, for example, fiber optics, etc., as the communications medium without deviating from the scope or spirit of the present invention.

Figure 1:
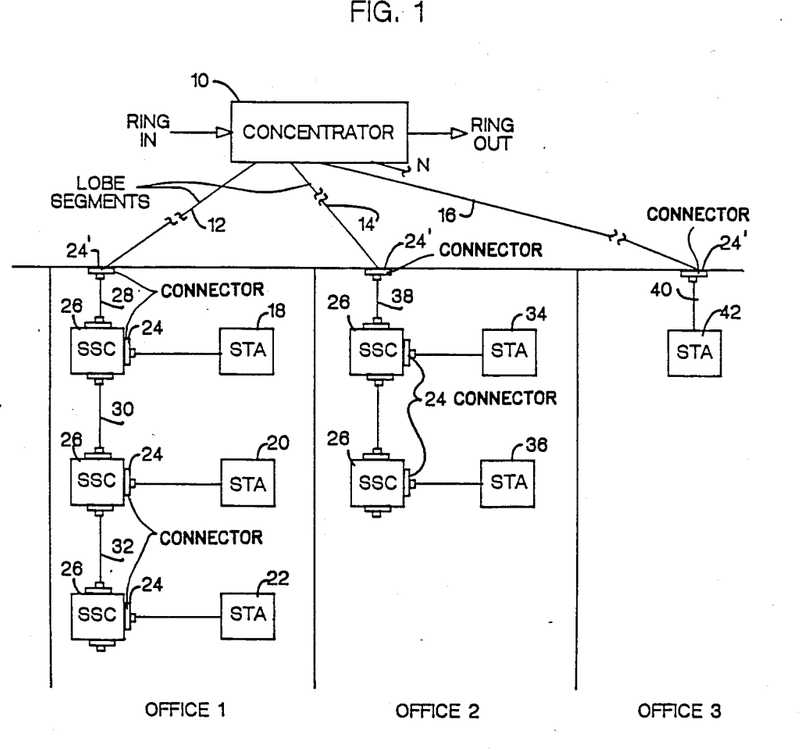
FIG. 1 shows a block diagram of the circuit arrangement according to the teachings of the present invention.

FIG. 1 shows a circuit arrangement according to the teaching of the present invention. The circuit arrangement includes a centralized switch controlled concentrator 10. The centralized switch controlled concentrator 10 either inserts a nodal segment into the ring communications network or bypasses the nodal segment. As is used hereinafter, a nodal segment includes a lobe segment such as 12, 14, 16, . . . N and its attached devices. Only two segments of the ring communications system are shown in FIG. 1. The input section is labeled "Ring In" and an output section is labeled "Ring Out". Signals going into the concentrator are presented on the Ring In section while signals emanating from the concentrator are outputted on Ring Out section. It should be noted that in reality the ring is a closed loop in which the ring out segment of FIG. 1 is tied to the ring in section. It should also be noted that the ring out segment could be attached to one or more centralized switch controlled concentrators 10.

As will be explained subsequently, the centralized switch controlled concentrator 10 includes a plurality of switching modules each one being operable when activated by phantom current (to be explained subsequently) from an attached station inserts the station into series with the ring communications network. Although any number of switching modules can be provided in concentrator 10, in the preferred embodiment of this invention eight switching modules are provided. To this end, it should be noted that the concentrator allows star wiring of stations to a ring communications network.

FIG. 1 also shows a schematic of the circuit arrangement for wiring the offices of a building. Office 1 shows a plurality of stations or data terminal equipment identified by numerals 18, 20 and 22. Each station is connected through a connector 24 to a single station connector (SSC) 26. The single station connectors 26 are connected in series by communications media length 28, 30 and 32. Although any type of communications media can be used for interconnecting the various components of the circuit arrangement, in the preferred embodiment of this invention the communications media length is twisted pair conductive wires. A pair of wire is used to carry signals into the station and a pair of wires is used for transmitting signals from a station. The communications media length 28 interconnects the SSC 26 to connector 24'. The connector 24 is coupled by lobe segment 12 to a dedicated switching module within concentrator 10.

In order to place one of the stations 18, 20 or 22 of office 1 into the loop, that station generates a d.c. output current called a "phantom current." As a result of the phantom current, the corresponding switching module located in concentrator 10 switch the station with the associated devices into the ring, thereby allowing information from the station to be placed on the ring or information for the station to be extracted from the ring. It should be noted that using a plurality of single station connectors 26, lobe segment 12 is extended so that more than one station in an office can be interconnected to lobe segment 12. As will be described later, a plurality of the single station connector 26 can be configured in an office to form a local area network between the stations therein without utilizing the facility located beyond conductor 24'. It should also be noted that although any type of conventional connector can be used to make the attachment in the preferred embodiment of this invention a wrap-around type connector is used. With this type of connector, if one-half of the connector is plugged out, the other half utilizes the self-shorting pass characteristics and signals traveling into the connector are wrapped around in the connector and fed back out. U.S. Pat. No. 4,449,778 describes a self-shorting type of connector which can be used in the present invention. The teaching set forth in that patent is incorporated herein by reference.

Still referring to FIG. 1, office 2 includes two stations (STA) identified by numerals 34 and 36. As with office 1, each station is connected to a single station connector 26 via connector 24. The single station connectors 26 are connected in series and are attached via a length of communication media 38 to connector 24'. The output from connector 24' is connected by lobe segment 14 to one of the switching modules (to be described hereinafter) located in concentrator 10.

Office 3 has a single station, and that single station is connected by communications media 40 to connector 24'. Connector 24' in turn is connected by lobe segment 16 to an appropriate switching module. As is evident from the figure and the description, unless multiple stations are needed in an office, then the single station connector 26 need not be used. For a single station, such as 42, the station can be connected directly to the connector 24'.

Figure 2:
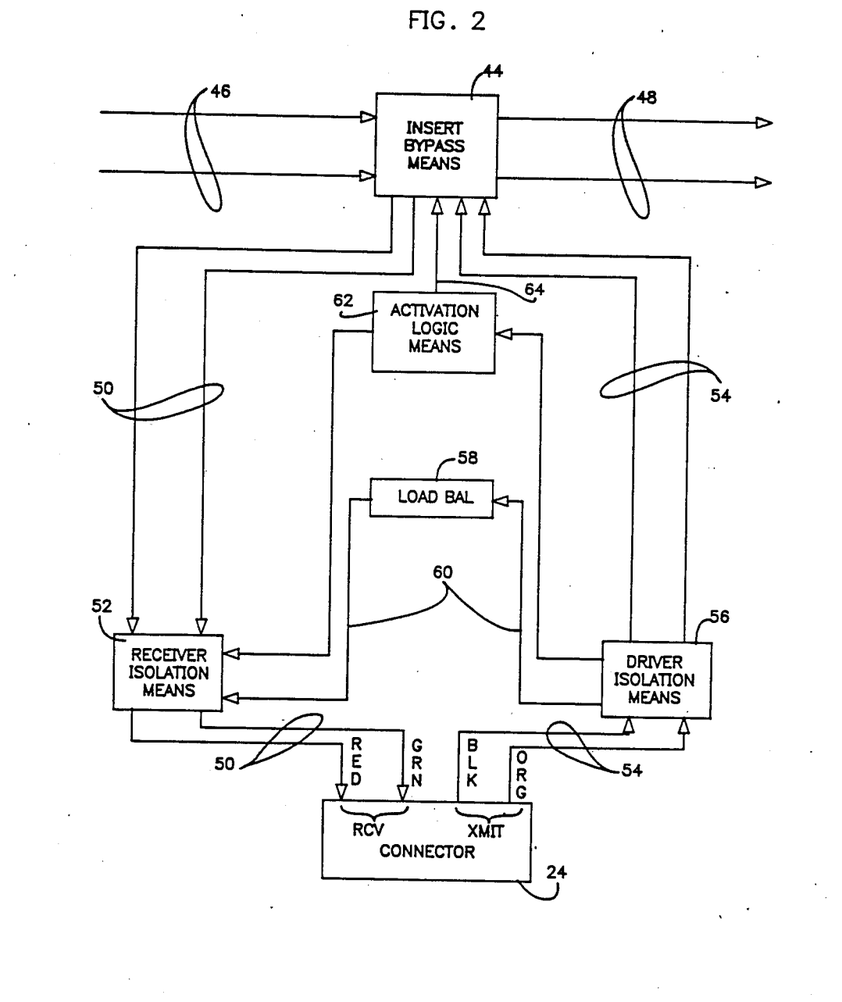
FIG. 2 shows a functional block diagram of a switching module.

FIG. 2 shows a functional block diagram for the switching modules which are located in the centralized switch controlled concentrator 10 (FIG. 1). As stated previously, these switching modules are identical; therefore, the description in FIG. 2 is applicable to all switching modules in the concentrator. Each module includes an insert bypass circuit means 44. The bypass insert circuit means provides the mechanism that inserts or bypasses a lobe segment into the ring. Signals into the insert bypass circuit means 44 are provided on conductor pair 46. Similarly, signals out of the insert bypass circuit means 44 are supplied on conductor pairs 48. The arrows on the various lines show the direction in which the signal is traveling.

Conductor pair 50 (dubbed the receive pair) interconnects the insert bypass means 44 to receiver (RCVR) isolation circuit means 52. The function of the receiver isolation circuit means 52 is to provide d.c. isolation between each lobe of the concentrator 10 and common mode noise rejection for the a.c. protocol signals. The a.c. protocol signals carry data and are allowed to pass through receiver isolation means 52 while d.c. phantom drive current is blocked. The receiver isolation circuit means 52 also provides separate and distinct paths for the phantom drive current. One path is formed by the orange wire of the transmit (XMIT) pair to the red wire of the receive (RCV) pair. The other path is formed by the black wire of the transmit to the green wire of the receive pair. Connector pair 50 also interconnects the receiver isolation circuit means 52 to connector 24. For purposes of simplifying the description, receive pair 50 is color coded whereby one wire is coded red, and the other wire green. Of course, any other type of coding scheme could be used to identify the wires without departing from the scope of the invention.

Still referring to FIG. 2, signals to be placed on the loop are supplied through connector 24 to transmit (XMIT) pair 54. The conductors of transmit pair 54 include a black (BLK) and a green (GRN) coding designation. A segment of transmit pair 54 interconnects connector 24 to driver (DRV) isolation circuit means 56. The functions provided by driver isolation circuit means 56 are identical to the functions provided by receiver isolation circuit means 52. The load balance circuit means 58 is interconnected by conductor 60 to receiver isolation means 52 and a driver isolation means 56. In the preferred embodiment of this invention the load balance circuit means is a resistive means. The resistive means is connected to the phantom drive circuit (not shown) provided in the attached device by the black and green wires in the transmit and receive pairs, respectively. As will be explained subsequently, the resistance of load balance means 58 matches that of the activation logic circuit means 62. As a result of the matching, an attached node or station can detect some wire faults occurring between the concentrator and the node by sensing an imbalance between the two phantom drive circuits. The details of the wire fault detection technique are fully described in the above referenced U.S. patent application Ser. No. 507,252.

Still referring to FIG. 2, the activation logic circuit means 62 is coupled to the phantom drive circuit (not shown) by the orange and red wires of the transmit and receive pairs, respectively. The activation logic circuit means 62 ensures that when the phantom drive current is presented, the lobe is inserted into the primary ring path and when phantom drive circuit is not presented, the lobe is bypassed (i.e., de-inserted). Its output is connected over conductor 64 to the insert bypass circuit means 44. Although any conventional activation logic circuit means can be used for controlling insertion bypass circuit means 44, in the preferred embodiment of this invention a capacitor is located in the activation logic circuit means 62 and is charged via the phantom current until the quantum of charge is sufficient to set and reset the relay. Energy is extracted from the capacitor to drive the bypass circuit means 44 which actually attaches the lobe to the loop. Details of the activation logic circuit means 62 are given in U.S. Pat. No. 4,527,216.

Figure 3:
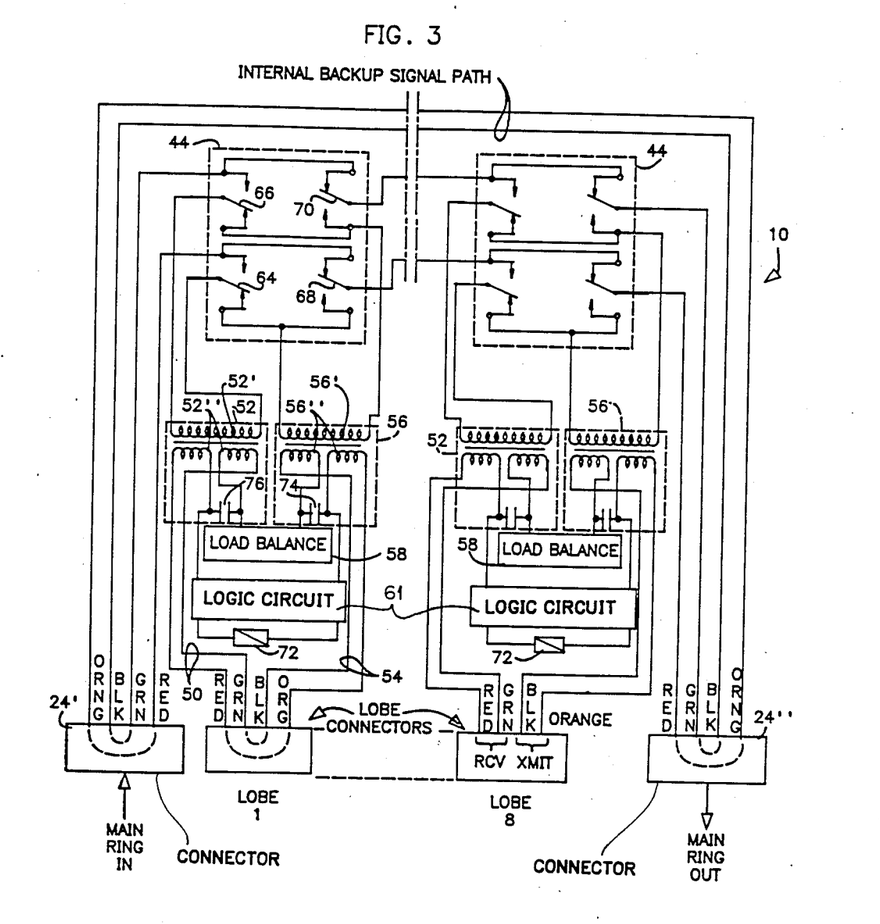
FIG. 3 shows a conceptual schematic of the wiring concentrator.

FIG. 3 shows a conceptual schematic of the centralized switch controlled concentrator 10. As stated before, the concentrator 10 includes the plurality of lobe insertion circuits identified as lobe 1 - lobe 8. Since all of the lobes are identical, only lobe 1 will be described in detail, it being understood that the other lobes operate and function in an identical manner. Also, to simplify the description elements of FIG. 3 which are identical to elements described in FIGS. 1 and 2 will be identified by common numerals. Connector 24' forms the input-point into the concentrator. The segment of the main ring that is connected to connector 24' is referred to as Main Ring In. Two pairs of wire conductors are connected to the output half of connector 24'. In order to simplify the description, the conductors are identified by different color codes. The pair of conductors identified by green (G) and red (R) transmits electrical signals from the ring into lobe 1. Likewise, the pair of conductors identified as orange (O) and black (B) forms an internal backup signal path and is connected to exit connector 24''. Similarly, the red and green conductors interconnect the last lobe (lobe 8) of the concentrator to the output connector 24'''. The segment of the ring identified as ring out is connected to exit connector 24''. It should be noted that if several concentrators were utilized the output from 24° would be connected to the input of another concentrator. As stated before, all of the connectors used in this embodiment are self-shorting. The self-shorting characteristics of the connectors are shown by the dotted line which is used in each connector block to interconnect and identify conductors. For example, in input connector 24' the conductor labeled red (R) is connected by a broken line to the orange (O) colored conductor. Similarly, the green (G) conductor is connected by a dotted line to the black (B) connector. The same connection is provided for in the lobe connectors and the output connector 24''. The broken line indicates that the connectors are self-shorting. This means that if a connector half is not plugged into the other half signals on any two of the conductors, say, for example, green and red conductors, will be fed back on the black and orange conductors or vice versa.

Still referring to FIG. 3, lobe 1 and the other lobes in the concentrator include transmit pair 54 and receive pair 50. Signals from the ring are received on the received pair 50 and ultimately sent to the attached device (not shown).

Likewise, signals to be inserted on the loop are supplied on the transmit pair 54. The transmit pair 54 is coupled to the windings of drive isolation circuit means 56. Similarly, the receive pair 50 is connected to the windings of receiver isolation circuit means 52. In the preferred embodiment of this invention, the receiver isolation circuit means 52 and the driver isolation circuit means 56 are conventional signal transformers. The output windings from the driver isolation circuit means 56 are connected to insertion bypass circuit means 44. Similarly, the output windings from receive isolation circuit means 52 are coupled to the insertion bypass circuit means 44. In the preferred embodiment of this invention the insert bypass circuit means 44 is fabricated from four form C conventional relays. Of course, other types of switching circuits such as those fabricated from solid state devices can be used to replace the relay contacts.

Coil 52' is connected to poles 64 and 66, respectively. Similarly, coil 56' is connected to contacts 68 and 70, respectively. The connection in FIG. 3 shows the bypass circuit means 44 in a bypass mode. In the bypass mode electrical signals on conductors green (G) and red (R) connector 24' are transmitted through the relays onto the exit connector 24" via the red and green conductors. In the bypass mode signals bypass the respective lobes and do not enter into stations (not shown) connected to that lobe. The relays in the bypass circuit means 44 are coupled by an electromagnetic linkage to the actuation logic circuit means 62. The electromagnetic linkage is shown schematically, in FIG. 3, by numeral 72. The details of the actuation logic control circuit means 62 will be described subsequently. Suffice it to say at this point that when activated the logic control means 62 positions the contacts of the relay so that signals on the green and red conductors enter the lobe.

Still referring to FIG. 3, capacitive means 74 divides windings 56" into a split winding. This split winding creates a separate and distinct path for DC signal outputted from an attached device on transmit pair 54. Similarly, capacitor 76 divides coil 52" into split windings. A resistor labeled load balance in the figure interconnects the (B) transmit conductor (of the XMIT pair) with the (G) receive conductor (of the RCV pair). Similarly, the (O) transmit conductor is connected through the actuation logic circuit means 62 to the (R) receive conductor. With this configuration DC signal outputted from attached device (not shown) travel through two distinct paths and are returned to the sending device. By providing a means for transmitting the DC signal on two distinct paths, an attaching device can determine if and when a device is unplugged between the concentrator and the office wall plug. Details of this invention are beyond the scope of the present application, but are described in the above application Ser. No. 507,252.

As stated previously, the other switching modules or lobes within concentrator 10 are identical to lobe 1 and as such the description in lobe 1 is intended to cover the other lobes.

Figure 4:
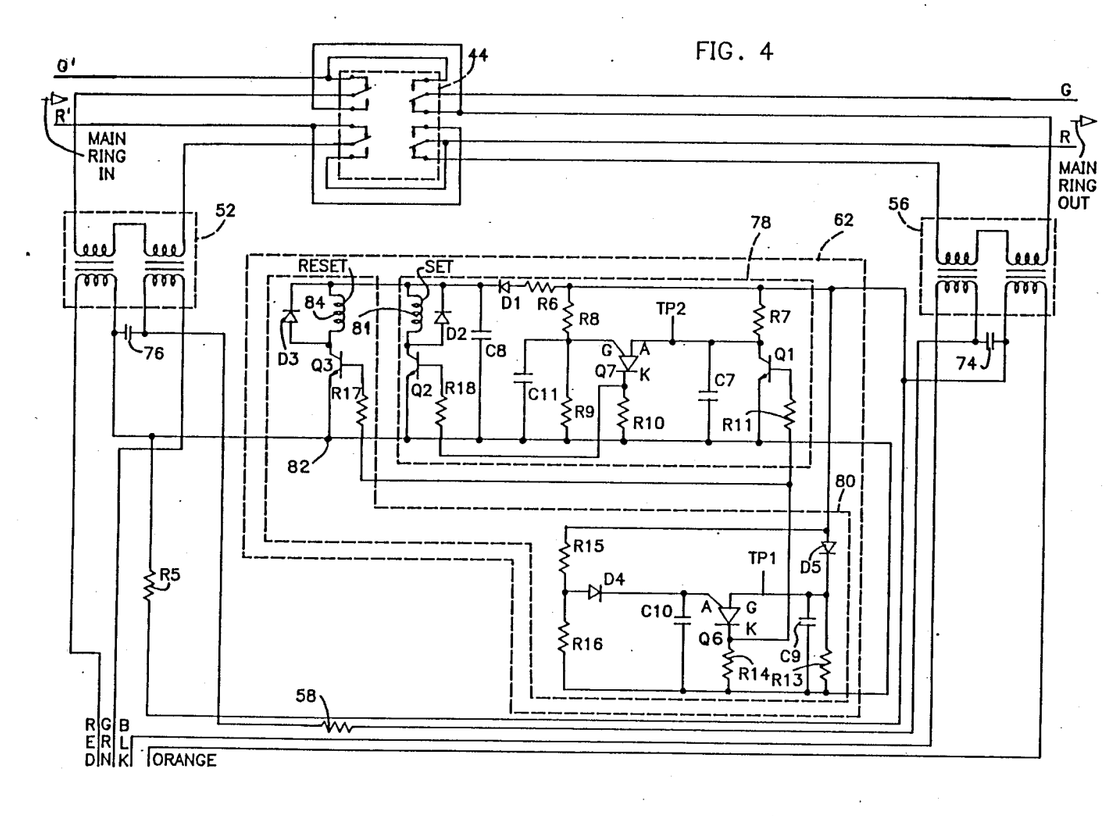
FIG. 4 shows a circuit schematic for the switching module.

FIG. 4 shows a circuit schematic for lobe 1, it being understood that the circuit schematic for the other lobes is identical. In FIG. 4, elements which have already been described are identified by the same numerals and will not be described again. To this end, element 44 represents the relays which are switched by actuation logic circuit means 62 to place a station into the loop or to de-insert a station therefrom. Transformers 52 and 56 provide DC isolation to each lobe. Capacitors 76 and 74 provide the means by which DC signals emitting from an attached device are made to travel along separate and distinct paths back into the attached device. These elements have already been described, and their description will not be repeated here.

The details of activation logic circuit means 62 will now be given. As stated previously, the function of the activation logic circuit means 62 is to insert a lobe and its attached station into the loop. The configuration shown in FIG. 4 represents a situation where the lobe is attached to a loop. In this configuration signals from the main ring in segment of the ring are received on conductors G' and R'. The signal is fed through relay 44 through transformer 52 and into an attached station (not shown) on the red (R) and green (GN) conductors, respectively. Similarly, signals from the attached station are fed on the black (BK) and orange (OR) conductors through transmit transformer 56 through relay 44 and onto the ring via the green and red conductors. It should be noted that for DC phantom current outputted from the station on the BK and OR conductors the signal is sent back into the terminal on the red and green conductors. This is so because although AC data signals are allowed to pass through the transformer DC signals are blocked.

Still referring to FIG. 4, the activation logic circuit means 62 includes a set circuitry arrangement identified by numeral 78 and a reset circuitry arrangement identified by numeral 80. The orange (OR) conductor supplies input phantom current to the set and reset circuitry simultaneously. The set and reset circuitries 78 and 80 are connected to a common reference potential identified by numeral 82. The set circuitry 78 includes a set programmable uni-junction transistor (PUT) 07. Although a PUT is used as a switching element of the said circuitry, this should not be construed as a limitation on the scope of the invention since it is within the skill of one skilled in the art to use other switching elements to provide the function which the PUT provides. The PUT is an electronic component that remains in a non-conductive state providing that the voltage on the gate (G) terminal or electrode is higher than the voltage on the anode (A) terminal. As soon as the gate voltage becomes lower than the anode voltage, the PUT is placed in a conductive state. The anode terminal of the PUT is coupled through capacitor C7 to reference potential 82. The positive plate of capacitor C7 is tied to resistor R7 and the collector of transistor Q1. The emitter of transistor Q1 is tied to reference potential 82 while the base of Q1 is tied to resistor R11. Resistor R11 is connected to the cathode (K) terminal of reset PUT Q6 and to R17. R17 is connected to the base of transistor Q3.

Still referring to FIG. 4, the cathode terminal (K) of PUT Q7 is tied by resistor R10 to reference potential 82. The cathode of PUT Q7 is also tied through resistor R18 to the base of transistor Q2. The emitter of transistor Q2 is tied to reference potential 82 while the collector of transistor Q2 is tied to set coil 81. As will be explained subsequently, when PUT Q7 is in a conductive mode, Q2 is turned on and as a result a portion of the charge on C8 is dumped into set coil 82 and the contacts in relay 44 are set in a first state.

Diode D2 is placed in parallel with set coil 81. The gate electrode (G) of PUT Q7 is tied to resistors R8, R9 and capacitors C11. Capacitor C8 is the set/reset capacitor and is interconnected between reference potential 82 and the orange (OR) conductor that supplies the phantom current to the set circuit. Diode D1 and resistor R6 are connected in series in the orange conductor. The series combination of D1 and R6 controls the rate at which C8 is charged. It should be noted that energy from C8 is not supplied to the set coil 82 until there are sufficient charges on C8 to set and reset the latching relay 44.

Still referring to FIG. 4, the reset circuitry arrangement 80 comprises of a reset PUT Q6. The cathode (K) terminal of PUT Q6 is coupled by resistor R11 and transistor Q1 to the set circuitry 78. The cathode electrode (K) is also connected by resistor R14 to reference potential 82. Capacitor C9 couples the gate electrode of PUT Q6 to reference potential 82 while diode D5 and resistor R13 couple the gate electrode of PUT Q6 to reference potential 82 and the orange input terminal. The cathode of reset PUT Q6 is also coupled through resistor R17 to the base of transistor Q3. As will be explained subsequently, when transistor Q3 becomes conductive, energy is dumped in reset coil 84 and the latching relay 44 is placed in a second state or reset state. Diode D3 is placed in parallel with reset coil 84. Capacitor C10 couples the anode of PUT Q6 to reference potential 82. The anode is also coupled through the diode D4 to resistors R15 and R16, respectively.

In operation, power (low voltage) for the relay control circuitry is supplied on transmit wire pair Black (BLK) and orange (ORG) respectively. The low voltage is supplied by a DC phantom circuit (not shown). The circuit is located in an attached device (not shown). Upon application of the phantom voltage to the activation logic circuit means 62, the gate of set PUT Q7 is immediately biased at some fraction of the phantom voltage due to the R8, R9 voltage divider. Capacitor C11 is used to prevent premature firing of the set PUT due to noise or glitches on the phantom voltage input which may occur during the said cycle.

The voltage at the anode of Q7 rises as C7 is charged through R7. Meanwhile, set/reset capacitor C8 is charging through R6 and D1. Due to the difference in time constants, C8 charges faster than C7. The R7, C7 time constant is set to ensure that Q7 does not fire until sufficient charge has accumulated on C8. As stated before, this charge has to be of a sufficient magnitude to set and reset the coils which drives the latching relay 44. Once the anode voltage of Q7 exceeds the gate voltage by 0.2 to 0.6 volts, Q7 becomes conductive and diverts the energy stored in C7 through Q7 biasing Q1 to an "ON" state. C8 then partially discharges through the set coil 82 thereby setting relay 44 in a first state. As C7 charges, Q2, base current drops sufficiently to turn Q2 off, thereby preserving the remaining charge on C8.

Q7 is still in a conductive state due to the holding current which is determined by R7 and R10. Q7 remains in the on state until phantom voltage on the orange (OR) conductor is removed from the circuit, which causes the reset circuit to fire Q1, thereby shunting C7 to ground.

Concurrently with the initial application of phantom voltage to the set circuit, phantom voltage is also applied to reset circuitry 80. The voltage on the gate of the reset PUT Q6 is one diode voltage dropped lower than the applied phantom voltage. This drop is provided by diode D5. The voltage at the anode of Q6 rises as C10 charges through the equivalent parallel resistance of R15 and R16, respectively. Since this time constant is greater than that for the gate circuitry, the gate voltage is always higher than the anode voltage. D5 and C9 are provided to maintain the gate voltage during glitches in the phantom drive voltage. D5 and C9 also prevent premature firing of the reset PUT Q6 while circuitry 62 is in a "set" state. Under normal operation, the phantom voltage or current on the orange conductor is a step signal. Thus, when it is removed C9 discharges through R13 until the gate voltage drops to 0.2 to 0.6 volts below the anode voltage. It is this time constant which provides for a delay between the removal of the step phantom voltage and the actual reset of the relay. When the gate voltage drops to 0.2 to 0.6 volts below the anode voltage, the reset PUT Q6 fires diverting the energy stored in C10 through Q6, biasing Q1 and Q3 to an on state. Q3 allows C8 to discharge through the reset coil 84, thereby resetting the relay to another state. Q1 shunts Q7 to ground, thereby causing the set PUT to prepare for a subsequent set cycle. As C10 discharges the current through Q6, it drops below its rated holding current, thereby initializing reset PUT Q6 for another cycle.

Under abnormal operation, phantom voltage may decay at a slower rate (less than 1V/sec.) than the normal step signal. In this case, diode D1 isolates the anode of Q6 from the decaying phantom voltage. This ensures that sufficient charge is maintained on C10 to initiate a reset of the relay. Without the isolation provided by D4, the voltage on the anode and the gate will decay at the same rate and the gate voltage would never drop to the required 0.2 to 0.6V below the anode gate to fire Q6 which is a prerequisite for accomplishing a reset.

The voltage divider consisting or resistors R15 and R16 is designed such that the voltage on the anode of Q6 is always lower than the voltage on the gate for variations in phantom voltage within the operating range of 3.9V–5.2V. This ensures that the reset will not take place for variation in phantom voltage within the operating range.

It should be noted that although FIG. 4 shows the details of an activating logic circuit means 62 it is well within the skill of the art to design other circuits which will function equally as well. For example, a circuit described in the above-referenced U.S. Pat. No. 4,527,216 will function equally as well.

Although it is well within the skill of one skilled in the art to select appropriate values for the components of FIG. 4, Table 1 sets forth the values of components which were used.

TABLE 1

| COMPONENTS | VALUE |
|---|---|
| 76 and 74 | .47 farad |
| C7 | 68 farad |
| C8 | 1000 farad |
| C9 | .56 farad |
| C10 | 68 farad |
| C11 | 1.5 farad |
| R5 | 10.2K ohms |

TABLE 1-continued

| COMPONENTS | VALUE |
| --- | --- |
| R6 | 274 ohms |
| R7 | 22.1K ohms |
| R8 | 237K ohms |
| R9 | 604K ohms |
| R10, R11 | 274K ohms |
| R12 | 58K ohms |
| R13 | 249K ohms |
| R14 | 100K ohms |
| R15 | 7.5K ohms |
| R16 | 8.66K ohms |

Referring again to FIG. 3, each lobe provides the means for a lobe segment and attached device/devices to be inserted into the ring. To this end, a phantom drive voltage is supplied from an attached device (not shown) through the lobe input connector to the transmit pair 54. One leg of the phantom drive voltage is applied across the activation logic circuit means 62 which causes relay 44 to activate (after a time delay) and remain activated until the phantom drive voltage is removed. The activation of the relay causes the lobe to be placed in series with the ring coupled through isolation transformers 52 and 56, respectively. The isolation transformers provide DC isolation between the lobes. The split windings (52' and 56') of the isolation transformer also provide an additional DC isolation between the two legs of the phantom drive voltage provided on each wire of the transmit pair. This isolation is maintained throughout the concentrator. This arrangement along with the load balance circuit provides the capability for an attached device to detect opens and shorts in much of the wiring between the device and the concentrator. The device does this by detecting a current imbalance between the two transmit pair wires which are supplying current for the phantom drive. The load balance circuit which is in series with the other leg of the phantom drive is intended to balance the current drain between the two phantom drive sources. The capacitors 74 and 76 between the split windings provide DC isolation for the phantom drive while allowing the AC data carrying signal to pass.

Figure 5:
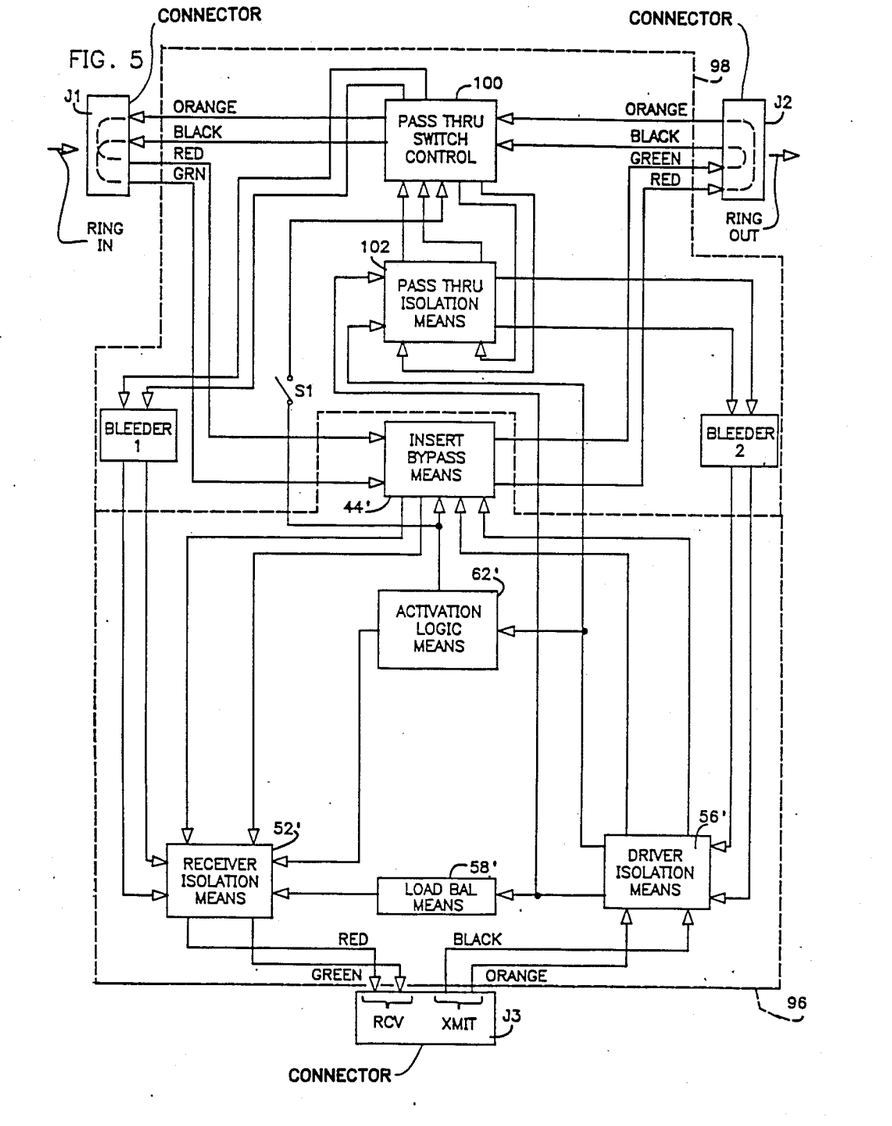
FIG. 5 shows a functional block diagram of the single station connector (SSC) according to the teachings of the present invention.

FIG. 5 shows a block diagram for the single station connector (SSC) according to the teaching of the present invention. The single station connector can be used in conjunction with the concentrator as a lobe segment extender (FIG. 1). When used as a lobe segment extender, the single station connector attached several stations to a single lobe segment. The single station connector can also be configured wherein it is used to attach stations to a communications network.

Figure 8:
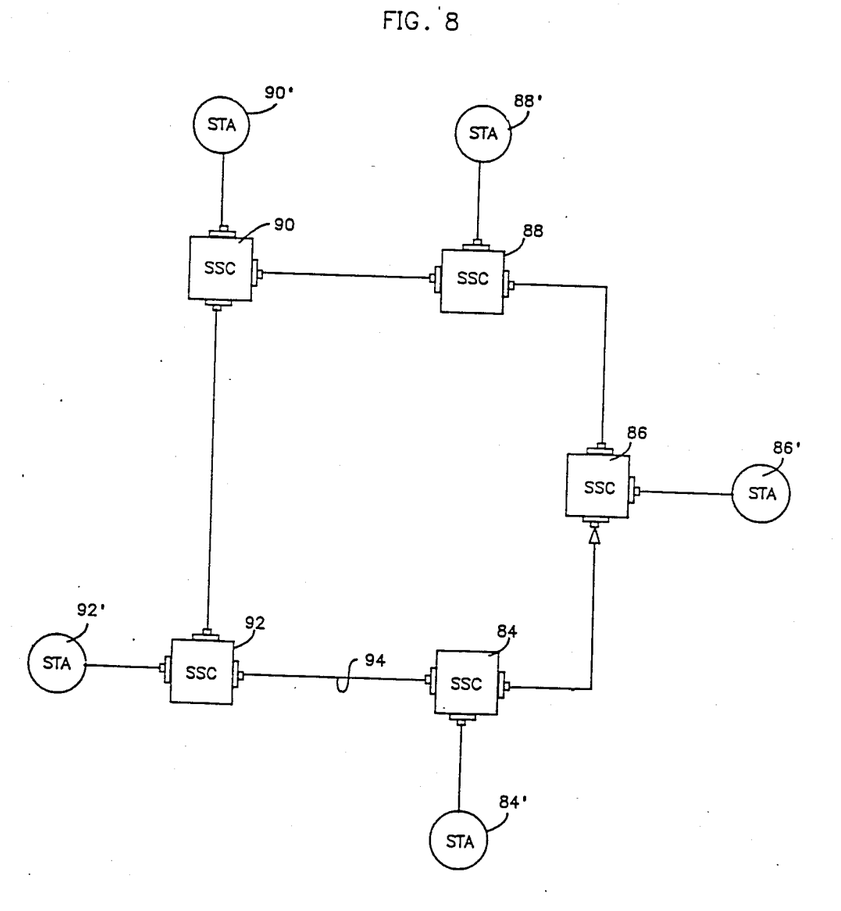
FIG. 8 shows the schematic of a communications network form from single station connectors.

Turning to FIG. 8 for the moment, there is shown a schematic for a communications network wherein a plurality of single station connectors identified by numerals 84-92 is used to interconnect a plurality of stations identified by numerals 84'-92'. Each single station connector attaches a single station (STA) to communications medium 94. Whether the SSC is used as a lobe segment extender, (FIG. 1), or as a single station connector, (FIG. 8), it is controlled by the attached station via a phantom drive signal. The phantom drive signal is a low-powered DC voltage that is impressed on both transmit wires, and is returned to the station on both receive wires. The phantom drive signal is transparent to the passage of nodal (that is, A.C.) protocol signals.

When the single station connector is used as is shown in FIG. 8, it provides an insertion/de-insertion function to the attached station. However, when the single station connector is used as a lobe segment extender (FIG. 1), it provides the basic insertion/de-insertion function and an added function called "phantom drive pass-thru protection." As will be explained subsequently, the phantom drive pass-thru protection feature ensures that only the phantom current from a native node (to be explained subsequently) is allowed to pass through to the concentrator 10 (FIG. 1). The phantom current from non-native stations or nodes are blocked and is returned to the sending stations. As is used in this application, a native station or node means a station that is coupled directly to a single station connector. Similarly, a non-native station refers to a station that is not directly coupled to the single station connector. Referring to FIG. 5 again, a native station would be one that is attached to the single station connector through J3. A non-native station would be one that is connected to another single station connector and is coupled to the single station connector through connector J2.

Still referring to FIG. 5, in order to perform the basic insertion function and the phantom drive pass-thru protection function the single station connector includes a station insertion means identified by numeral 96 and a pass-thru controller means identified by numeral 98. The station insertion means 96 provides the insertion function for a station connected to connector J3. In this regard, except for the details of the activation logic means 62' (details to be given later), the insertion function provided by functional blocks 52', 58', 56' and 44' are identical to the function provided by the insertion module of FIG. 2. Since these functions are already described, they will not be repeated here, it being understood that the insertion function provided by station insertion means 96 (FIG. 5) is substantially the same as the insertion function described by the switching module described in FIG. 2.

Still referring to FIG. 5, the pass-thru control means 98 includes a pass-thru switch control means 100. The pass-thru switch control means 100 is coupled to pass through isolation means 102. When activated, the pass-thru switch control means 100 and pass-thru isolation means 102 block the phantom current from a downstream station, thereby preventing the phantom current from passing through to the concentrator 10 (FIG. 1). Pass-thru switch control means 100 and pass-thru isolation means 102 are activated/deactivated via switch 1 (S1). Stated another way, when switch 1 is on, the pass-thru control means 98 is activated and when switch 1 is off, the pass-thru control means 98 is deactivated.

The other functional blocks in pass-thru control means 98 include bleeder (DLDR) 1 which is interconnected to the receive isolation means 52' and the pass-thru switch control means 100 and bleeder (BLDR) 2 which is interconnected between the driver isolation means 56' and the pass-thru isolation circuit means 102. The function, of bleeders 1 and 2, is to make sure that the phantom current is balanced in the single station connector when it is used as a lobe segment extender.

As described above, the balancing of the current in the circuit is necessary in that an attached station can perform reliability, availability and serviceability (RAS) tests. Three connectors J1, J2 and J3 provide for attachment of the single station connector to the ring and to a station. As before, each connector is of the self-shorting type and includes a transmit pair and a receive pair. The J1 connector attaches a single station connector to the segment of the ring labeled Ring In while the connector J2 attaches the single station to the Ring Out segment of the ring. The connector J3 provides the attachment for a station. When the connector halves are not mated, the connector is placed in a self-shorting mode whereby the transmit pair and the receive pair are coupled in the manner shown by the broken lines in connectors J1 and J2, respectively. This self-shorting feature, although not shown, is also present in J3. If the individual conductors are assigned a color scheme as is shown in FIG. 5, then for connector J1 the black conductor is self-shorted to the green conductor and the orange conductor is self-shorted to the red conductor.

Figure 7:
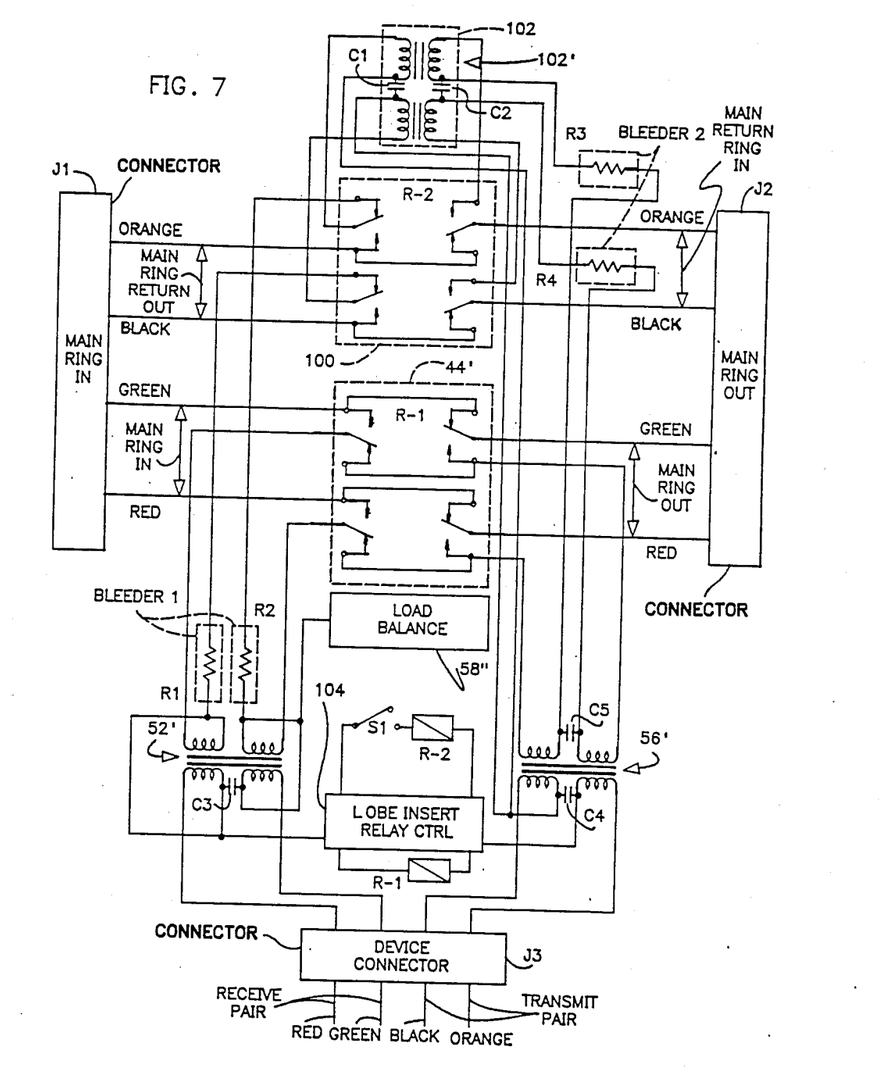
FIG. 7 shows a conceptual schematic of said SSC.

FIG. 7 shows a conceptual schematic of the single station connector. The schematic sets forth in greater detail the circuit components which are used in the single station connector and are shown in the functional block diagram of FIG. 5. To the extent possible elements which are common to FIG. 7 and FIG. 5 will be identified by the same numeral.

The J1 connector is termed the Main Ring Connector In and attaches the ring in segment of the ring to the single station connector. The letters O, B, G and R stand for orange, black, green and red. These refer to the color code that is applied to the tramsmit and receive wire conductors, respectively. The connector J1 has a main ring return out section and carries signals supplied to the orange and black conductors. The main ring in section of the connector carries signals supplied from the main ring on the green and red conductors.

The pass-thru switch control means 100 includes relay R-2 which is the phantom pass-thru relay. The relay is coupled to the main ring return out section of conductor J1., The relay R-2 is also coupled to the Main Return Ring in section of main ring connector out J2 and to the pass-thru isolation means 102. In the preferred embodiment of this invention, the pass-thru isolation means 102 includes signal transformer 102'. As stated previously, when S1 is thrown, R-2 (which represents the phantom pass-thru relay and its activation coil) is placed in the circuit and any phantom current that is supplied from a station downstream from the J2 connector is returned back through the connector to that station. As shown in FIG. 7, the pass-thru transformer and pass-thru relay are shown deactivated. In this deactivated mode signals coming in the Main Ring Return In section of the J2 connector are fed through R-2 to the main ring return out. The signal does not pass through transformer 102'. Had switch S1 been thrown, then signals from the Main Ring Return In section of J2 would have passed through blocking transformer 102'. As such, any DC signal from downstream would have been fed back to the originating station. The split windings in transformer 102' and capacitors C1 and C2 ensure that the returned DC current is separated. The bleeder resistors R1, R2, R3 and R4 ensure that the current in the single station connector circuitry remain balanced.

Still referring to FIG. 7, the input connector J1 includes a Main Ring In section. Signals on the Main Ring In section are provided on the red and green conductor which are tied to lobe insertion relay R-1. The lobe insertion relay R-1 inserts the lobe into the ring and any device that is attached to the device connector J3. The lobe relay R1 is also connected to the Main Ring Out section of Main Ring Out connector J2. Control of the contacts on relay R-1 is effectuated by lobe insertion relay control circuit 104. The electromechanical interconnection between the lobe insertion control circuit means 104 is shown by R-1. The function provided by the receive isolation transformer 52' and the driver isolation transformer 56' have already been described and will not be repeated here. Capacitors C3, C4 and C5 provide the separation of DC current which is outputted and returned to a device connector J3. The connector J3 includes a section that receives a signal on the R and G receive pair. It also includes a transmit section that outputs signals on the B and O transmit pair.

As can be seen from the above description, the full function version single station connector encompasses the basic function (that of lobe insertion) of the switching modules in concentrator 10 and the additional "phantom drive pass-thru" function. For the case of a minimal configuration, such as that shown in FIG. 8 (SSC only system configuration) the phantom drive pass-thru function is not needed. As such, S1 is open and deactivates the pass-thru function. For the case of using the single station connector to expand a single lobe segment connection to accommodate multiple attachments (FIG. 1), it is necessary to provide phantom drive current not only to the single station connector lobe insertion circuitry 96 (FIG. 5) single station connector but also to the lobe attached circuitry of the original node which is being expanded. In this regard, relay R1 (FIG. 7) provides the lobe insertion for the single station connector when phantom drive is provided by the attached device (not shown).

As phantom drive pass-thru is activated (S1), R-2 is activated by and deactivated in conjunction with R1. For purposes of discussion, assume that the single station connector shown in FIG. 7 is the first of a cascaded string of such single station connectors. The activation of R-2 causes phantom drive current from attached devices (not shown) to be applied to the upstream connector J1. At the same time the insertion of the isolation transformer 102' into the path of the Main Return Ring. In serves to block any phantom drive signals from a downstream lobe which may have been supplying drive to the upstream lobe. It also isolates the phantom drive signal of each SSC from each other and permit only the closest active downstream node to supply phantom drive to the upstream lobe. In addition, the split winding of transformer 102' and associated capacitors C1 and C2 ensures that the phantom current which is returned to the sending devices is constrained to traverse separate and distinct paths. As before, the attached device uses this characteristic to identify wire fault condition.

Figures 6, 6B:
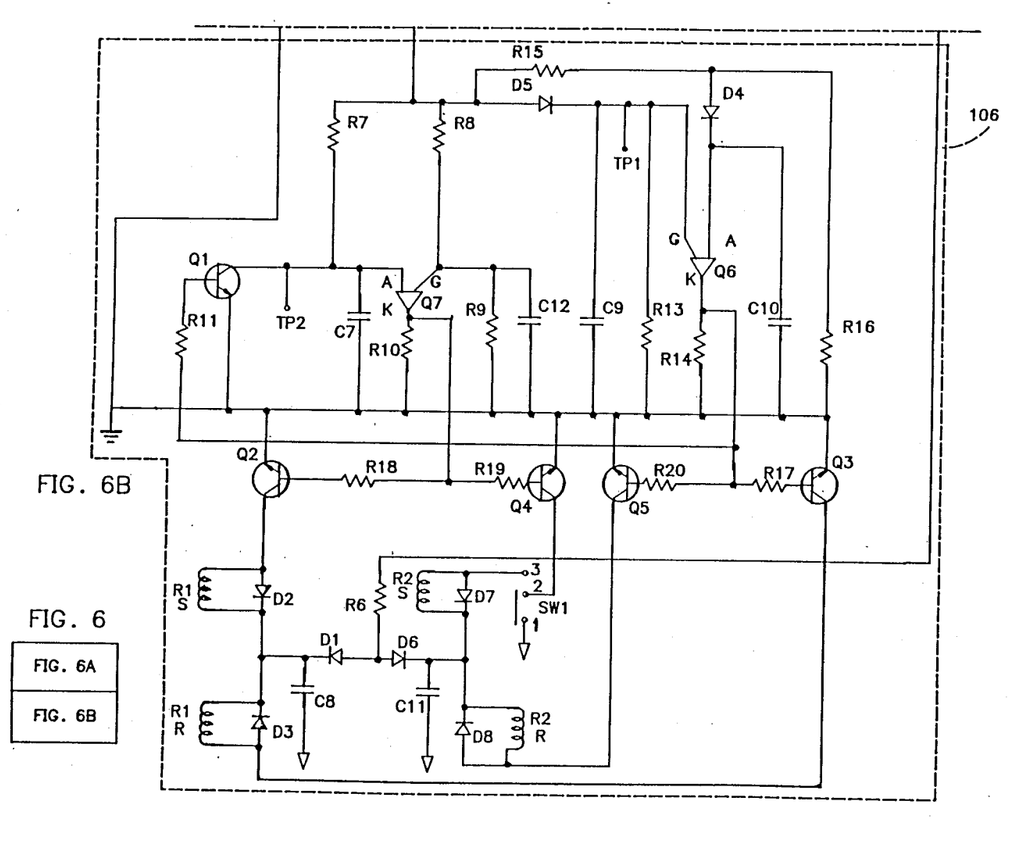
FIGS. 6A and 6B show a circuit schematic of the SSC.
Figure 6A:
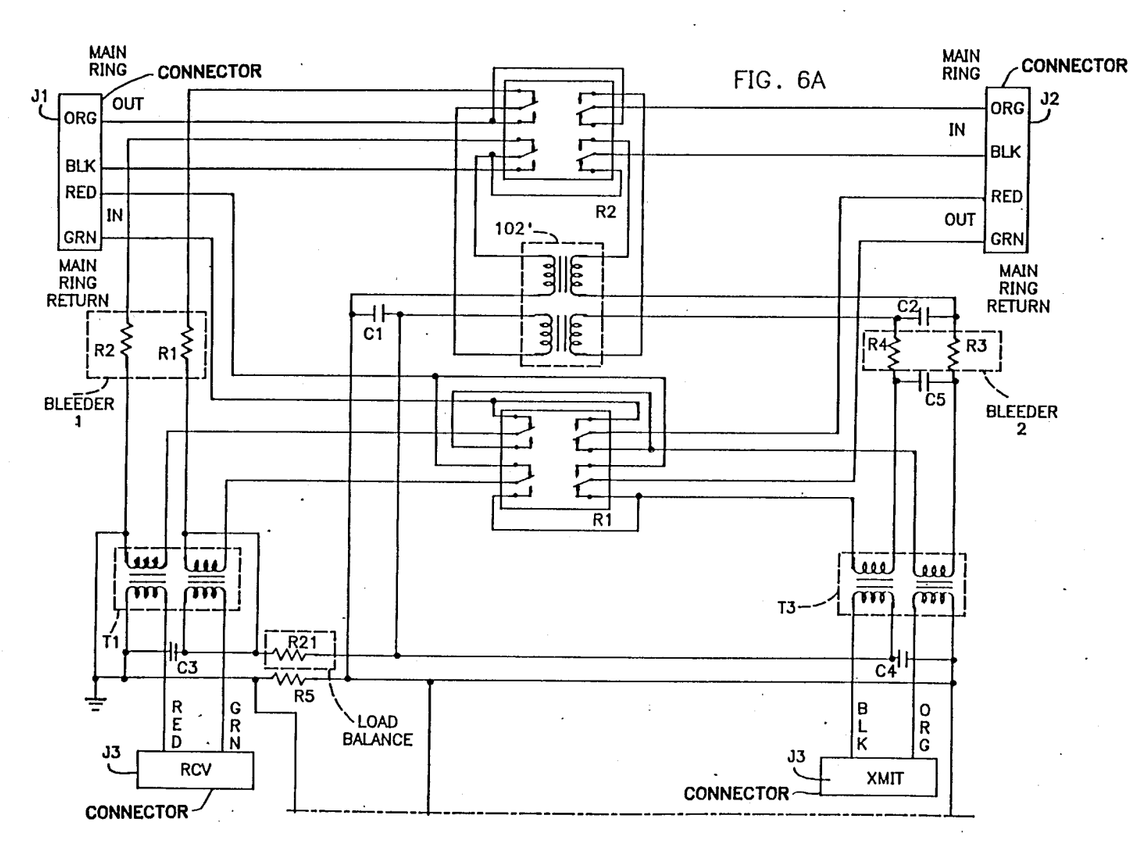

FIGS. 6A and 6B shown a circuit schematic of the single station connector. Elements in FIG. 6 that are similar to elements previously described are identified by common indicia and the function of these common elements will not be repeated. The description of FIG. 6 will be particularly concerned with the control and circuit logic means identified by numeral 106. Logic circuit and control means 106 includes the lobe insertion relay control means identified by numeral 104, (FIG. 7), and the activation logic means 62' (FIG. 5). As before, power for the circuit 106 comes from the DC voltage produced by the device attached to connector J3. Upon the application of phantom voltage to transmit (XMIT) pair the gate electrode of set programmable unijunction transistor (PUT) Q7 is immediately biased at some fraction of the phantom voltage due to the R8, R9 voltage divider. C12 is used to prevent premature firing of the set PUT due to noise which is on the phantom voltage input which may occur during the set cycle.

The voltage on the anode (A) lead of Q7 rises as C7 charges through R7. Meanwhile, C8 is charging through R6 and D1, and C1 is charging through R6 and D6. Due to the difference in time constants, C8 and C11 charge faster than C7. Once the anode voltage of Q7 exceeds the gate voltage by 0.2-0.6V, Q7 conducts, diverting the energy stored in C7 through Q7 biasing Q2 and Q4 to an "on" state. C8 then partially discharges through the set coil of R1 setting relay R1. It switch S1 has been set to bridge between contacts 2 and 3, then C11 partially discharges through the set coil of R2, setting relay R2 simultaneously with relay R1. If switch SW1 has been set to bridge between contacts 1 and 2, no discharge of C11 takes place through the set coil R2S. Hence, relay R2 is not set. As C7 discharges, the base current of Q2 and Q4 drops sufficiently to turn Q2 and Q4 off, thereby preserving the remaining charge on C8 and C11, respectively.

However, Q7 remains on due to the holding current which is determined by resistors R7 and R10, respectively. Q7 remains in the "on" state until phantom voltage is removed from the circuit which causes a reset to place Q1 in conduction thereby shunting C7 to ground and priming Q7 for another cycle of operation.

Concurrently with the initial application of phantom voltage to the set circuit previously described, phantom voltage is also applied to the reset circuit to be described hereinafter. The voltage on the gate electrode of the reset PUT Q6 is one diode voltage drop lower than the applied phantom voltage. The voltage at the anode of Q6 rises as C10 charges through the equivalent parallel resistance of R15 and R16. Since the time constant is greater than that for the gate, the gate voltage is always higher than the anode voltage, thus ensuring that Q6 comes up in an armed state.

D5 and C9 are present to maintain the gate voltage during glitches in phantom voltage to prevent premature firing of the reset PUT while the circuit is in a set state. Under normal operation, whereby the removal of phantom is a step function, C9 discharges through R13 until the gate voltage drops to 0.2 to 0.6V below the anode voltage. It is this time constant which provides for a delay between the step removal of phantom voltage and the actual reset of the relays. When the gate voltage drops to 0.2 to 0.6V below the anode voltage, the reset PUT Q6 fires, diverting the energy stored in C10 through Q6 biasing Q1, Q3 and Q5 to an "on" state. Q3 allows C8 to discharge through the reset coil of relay R1R, thereby resetting relay K1. Similarly, Q5 allows C11 to discharge through the reset of relay R2R, thereby resetting relay R2. Q1 shunts C7 to ground, thereby causing the set PUT to rearm for a subsequent set cycle. As C10 discharges, the current through Q6 drops below its rated holding current, thereby rearming Q6 for another cycle.

While the invention has been particularly shown and described with reference to a preferred embodiment thereof, it will be understood by those skilled in the art that various changes in form and details may be made therein without departing from the spirit and scope of the invention.

Having thus described our invention, what we claim and desire to secure as Letters Patent is as follows:

1. A circuit arrangement for attaching office machines to a communications network comprising:

a multi-access attachment means having a plurality of independently controlled attachment modules therein with each module being responsive to enabling signals outputted from a coupled device and for switching the device into electrical communication with said network;

a plurality of connector means for conveying electrical signals therethrough;

a plurality of separate lengths of communications media with each length of communications media interconnecting one of the plurality of connector means to one of the plurality of independently controlled attachment modules, and for carrying electrical signals therebetween;

a plurality of individual lengths of communications media with each length coupled to one of said connector means; and a plurality of single station attachment means each one coupled to one of the individual lengths of communications media said single station attachment means selectively forwarding the enabling signal from a station connected to said attachment means to one of the modules and to block the passage of enabling signals from a station not connected to said single station attachment means.

2. The circuit arrangement of claim 1 wherein the connector means is of the wraparound signal type.

3. The circuit arrangement of claim 1 wherein the attachment modules include an input terminal means;

a first isolation means coupled to the terminal means and controlling the passing of electrical signals;

a switching means coupled to the first isolation means;

a second isolation means coupled to the switching means and controlling the passage of electrical signals; and a circuit means coupled to the switching means said circuit means generating signals for controlling the switching means.

4. The circuit arrangement of claim 3 further including an output terminal means coupled to the second isolation means.

5. The circuit arrangement of claims 3 or 4 wherein the terminal means includes a pair of wire conductors.

6. The circuit arrangement of claim 3 wherein the switching means includes a relay arrangement.

7. The circuit arrangement of claim 6 wherein the relay arrangement includes four form C relays and energization coils for positioning the relay contacts.

8. The circuit arrangement of claim 3 wherein the isolation means includes a signal transformer.

9. An improved switching module for inserting and deinserting data terminal equipment (DTE) on a communications highway comprising:

a first switching means coupled to the communications highway and the DTE; said switching means when placed in a first mode attaches the DTE to the communications highway and when placed in a second mode bypasses the DTE;

a controller for controlling the first switching means; said controller having a common node coupled to the DTE and a storage means for receiving d.c. signals from the DTE and building up a charge of sufficient magnitude for placing the first switching means in the first mode and second mode, respectively, a first energization circuit arrangement including a second switching element coupled to the common node and in parallel with the storage means, and when conducting forcing a portion of charge on said storage means to flow and set the first switching means in the first mode; and a second energizing circuit arrangement including a third switching element coupled to the common node and in parallel with the second switching element, said third switching element turning off the second switching element and causing the storage means to discharge the remaining portion of its charge to set the first switching means to the second mode when the d.c. signal ceases to flow from the DTE.

10. A signal concentrator comprising a plurality of switching modules according to claim 9 and further including communications media means for interconnecting said switching modules in tandem.

11. The signal concentrator of claim 10 further including a plurality of connectors one of each being coupled to a module and for providing communication paths to and from the module;
 a first connector means operable for interfacing an input of the concentrator with a communications highway; and
 a second connector means for outputting electrical signals from said concentrator onto the communications highway.

12. The signal concentrator of claim 11 further including an alternate communications path for conveying electrical signals from the first connector to the second connector.

13. The circuit arrangement of claim 1 wherein a single station attachment means includes a switching module according to claim 9 and further including means being responsive when activated to selectively pass electrical signals therethrough.

14. The improved module of claim 9 further including means positioned between the first switching means and the DTE said means preventing the d.c. signal from accessing the communications highway.

15. The improved module of claim 9 wherein the second switching element of the first energization circuit arrangement is a programmable unijunction transistor (PUT) having a cathode electrode, an anode electrode and a gate electrode;
 a series connected capacitive/resistive network interconnecting the anode of the PUT to the common node and a second reference node;
 a resistor interconnecting the cathode of said PUT to the second reference node;
 a switching transistor having its base connected to the cathode and its emitter connected to the second reference node; and
 a reference voltage generating means interconnecting the gate electrode of said PUT to the common node and the second reference mode.

16. The improved module of claim 15 wherein the third switching element is a PUT having a gate electrode, a cathode electrode and anode electrode, said PUT further including a series connected diode/resistive network coupling the gate of said PUT to the common node and the second reference node;
 a switching transistor with its base terminal coupled to the cathode of said PUT; and
 a reference voltage generating network coupling the anode electrode of said PUT to the common node and the reference node.

17. The circuit arrangement of claim 1 wherein the single station attachment means includes a common node for receiving d.c. enabling signals;
 a first storage means coupled to the common node;
 a first switching means coupled to the common node;
 a first relay control circuitry interconnecting the first switching means with the first storage means;
 a first switching relay coupled to the relay control circuitry;
 a second switching means coupled to the common node;
 a second relay control circuitry interconnecting the second switching means with the first storage means whereby said first switching means if placed in a conducting state causes a portion of charge to flow from the first storage means through the first relay control circuitry to set the switching relay in a first state and said second switching means if placed in a conducting state causes a portion of charge to flow from said first storage means to set the switching relay in a second state.

18. The circuit arrangement of claim 17 further including a second storage means coupled to the common node and in parallel with said first storage means;
 a first signal blocking control circuit connected to the second storage means;
 a second signal blocking control circuit connected in series with the first signal blocking control circuit;
 a signal blocking circuit means; and
 a third switch means interconnecting the first and second blocking control circuit to said signal blocking circuit means and if activated causing the signal blocking circuit means to inhibit the flow of d.c. signal therethrough.

19. A circuit arrangement for interconnecting data terminal equipment (DTE) to a communications highway comprising:
 a common node for receiving d.c. signals from a DTE connected thereto;
 a first storage means coupled to the common node for storing a charge of sufficient magnitude to insert and deinsert the DTE;
 a second storage means coupled to the common node and in parallel with said first storage means;
 a switching relay for inserting and deinserting the DTE;
 a relay control circuit means coupling the switching relay with the first storage means and the common node, said relay control circuit means including a set switch controlled to conduct when the charge of sufficient magnitude is being stored on the first storage means so that a portion of said charge sets the switching relay and a reset switch controlled to conduct in the absence of d.c. signals so that a remaining portion of the charge resets the switching relay;
 a signal blocking circuit means coupled to the communications highway;
 a signal blocking control circuitry coupling the second storage means to the signal blocking circuit means; and
 a switch means interconnecting the signal blocking control circuitry to the signal blocking circuit means whereby said switch means when activated causing the signal blocking circuit means to inhibit d.c. signals from passing therethrough.

20. A communications network including a communications media with a plurality of the circuit arrangement set forth in claim 19; connected thereto and a plurality of DTEs, one of each being connected to a circuit arrangement.

* * * * *